Feb. 25, 1930. W. A. HYATT 1,748,348
TURRET TOOL HOLDER
Filed Feb. 27, 1928
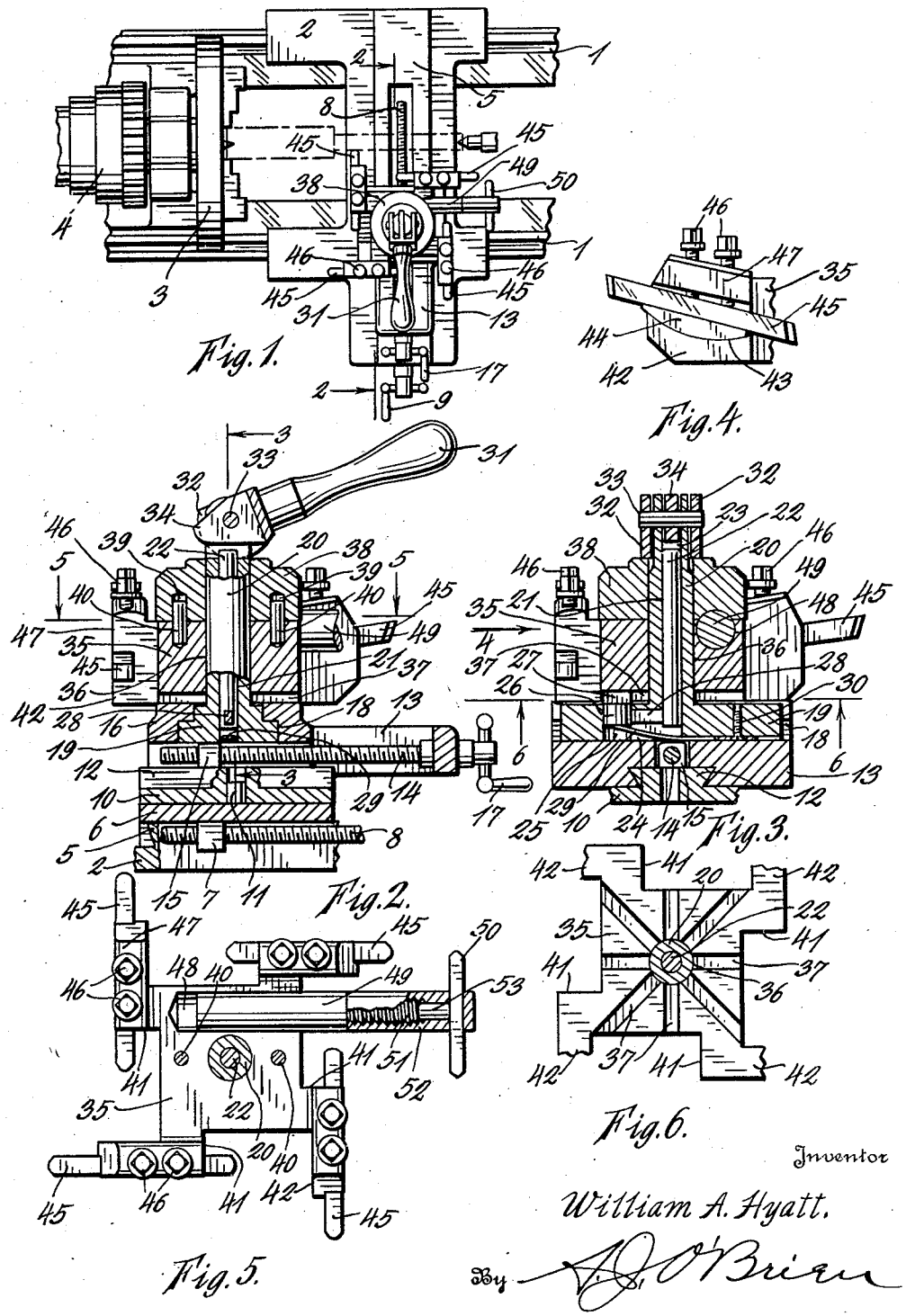
Inventor
William A. Hyatt.
By (signature)
Attorney Patented Feb. 25, 1930

1,748,348

UNITED STATES PATENT OFFICE

WILLIAM A. HYATT, OF DENVER, COLORADO

TURRET-TOOL HOLDER

Application filed February 27, 1928. Serial No. 257,195.

This invention relates to improvements in compound tool post for lathes and has for its object the production of a tool post that shall be so constructed that a plurality of tools can be attached to it and properly adjusted so as to perform different operations on an article which is being turned and which tools can be readily shifted so as to put them into operative position.

It is well known that where articles are to be turned out in large numbers and which require different operations that a large amount of time can be saved by employing what is known as turret lathes, as by means of this type of a lathe a large number of tools can be secured to the turret and properly adjusted so as to be removed and put into position in the desired order with a single movement of a lever. Such turret lathes are, however, very expensive and therefore are not available to everybody.

It is the object of this invention to produce a tool post that shall be so constructed that it can be rotated through an angle of forty-five or an angle of ninety degrees and which shall have attached to it a number of separate tools, which can be adjusted so as to be in proper position to perform different operations on the piece which is being constructed. This tool post is made very strong and so attached to the transverse carriage that it can be quickly released for the purpose of operation and quickly clamped in place and held rigidly during the operation. By means of a tool post such as will hereinafter be described, a large amount of time can be saved as it removes the necessity of stopping the lathes for the purpose of replacing or shifting the tools.

In order to describe my invention with the greatest possible clearness so that it can be readily understood, reference will be had to the accompanying drawing in which the preferred embodiment thereof has been shown and in which:

Fig. 1 is a top plan view showing a portion of a lathe and showing my improved tool post attached to the cross compound;

Fig. 2 is a section taken on line 2—2, Fig. 1;

Fig. 3 is a section taken on line 3—3, Fig. 2;

Fig. 4 is a detail elevation taken in the direction of arrow 4, in Fig. 3;

Fig. 5 is a section taken on line 5—5, Fig. 2; and

Fig. 6 is a section taken on line 6—6, Fig. 3.

In the drawing numerals 1 designates the guides with which the lathe is provided and 2 the lathe carriage which is slidable on guides 1. Numeral 3 designates the chuck and numeral 4 the cone pulleys with which the ordinary lathe is provided. The lathe carriage is provided with a longitudinal track 5 on which is slidably mounted a plate 6 to the under side of which is connected a nut 7 with which the screw 8 is rotatively connected. The end of screw 8 is provided with a crank 9 by means of which it is rotated so that the plate 6 may be moved longitudinally of track 5 and transversely of the lathe bed. Secured to the upper surface of plate 6 is a member 10, which has a center opening for the reception of a pin 11 about which it may be rotated. Suitable clamping means not shown is provided for holding plate 10 in any desired position. The upper surface of plate 10 is provided with a raised track 12 on which is slidably mounted the member 13. This member is provided with a screw 14 which is rotatively associated with a nut 15, which forms part of member 16 and by means of which the latter member can be moved in the direction of the length of screw 14. Screw 14 is provided with a handle 17 by means of which it can be rotated. Member 16 has a flat upper surface and is provided with a transverse T slot 18 within which is slidably located the base 19.

This head carries an upwardly extending central circular projection 20, which has an axial opening 21, within which is located a rod 22. The upper end of part 20 is provided with a diametrical slot 23 into which the upper end of the rod 22 projects. The bottom of the base 19 is provided with a cut-out 24 which extends from the opening in which the rod 22 is mounted to an opening 25 in which is located a plug 26, whose upper end has its sides flattened in the manner indicated at 27 and projects above the upper surface of member 19 in the manner shown in Fig. 3. Plug 26 is connected with the rod 22 by means of an arm 28 so that whenever the rod 22 is moved, it will also move the pin. A spring 29 is secured to the under side of the head 19 by means of a screw 30 and has its free end engaging the under surface of plug 26 so as to normally hold this plug and the rod 22 in the position shown in Fig. 3. A handle 31 is provided at one end with two cams 32 and a central cam 34. This handle is pivotally attached to the upper end of member 20 by means of a pin 33'. Handle 31 is also provided with a cam 34 which is located in the slot 23 and which is adapted to engage the upper end of rod 22 and force the latter downwardly against the action of spring 29 whenever the handle is moved into vertical position, but which will be spaced from the member 22 when the handle is in the position shown in Fig. 2. Rotatably mounted on member 20 is turret 35, which is provided with a central opening 36 for the reception of member 20. The under surface of the turret block 35 is provided with radial slots 37, which are preferably spaced forty-five degrees apart in the manner shown in Fig. 6. The flattened upper end 27 of pin 26 is adapted to engage these slots and to hold the turret from rotation. Located on top of the turret 35 is massive washer 38, which is provided on its under surface with openings 39 for the reception of the dowel pins 40 that are secured to the turret block 35 and which serve to properly locate the washer 38. The thickness of washer 38 is such that when the handle 31 is moved to the position shown in Fig. 2, that the cam surfaces 32 will engage the upper surface of this block and serve to clamp the turret block firmly against the upper surface of block 16. When handle 31 is moved to vertical position, cam 34 will serve to move pin 26 downwardly so as to release the turret block and permit it to be rotated through any number of degrees desired and after it has been rotated to the desired position, the handle is again moved to the position shown in Fig. 2 in which position cams 33 will clamp the parts so as to hold them rigidly secure to block 16.

Referring now more particularly to Fig. 5 it will be observed that the turret block 35 is substantially square and is provided at each corner with a projection 41, which, in turn, has a projection 42 that extends at right angles to the projection 41. Projection 42 has been shown in detail in Fig. 4 and is provided with a slot whose lower surface is curved on the arc of a circle in the manner indicated by reference numeral 43. A segment shaped block 44 rests on this curved surface and is adapted to serve as a support for the tool 45. Two clamping screws 46 extend through threaded openings in the upper wall 47 of the projection 42 and engage the tool so as to firmly clamp it in adjusted position. In the embodiment illustrated, there are four of these projections 42 for each turret block, but by increasing the size of the block, it may be possible to employ six or a greater number of these tool clamping projections.

From Fig. 3 it will be seen that the turret block 35 has been provided with an opening 48, whose center is located below the upper surface of the turret block a distance somewhat less than the radius of the opening and therefore this opening extends a short distance into the under surface of washer 38. Opening 48 is adapted to receive one end of a boring bar 49, to whose outer end a boring tool 50 is secured. This boring tool may be replaced by any other suitable tool which can be clamped in place in the manner explained.

In Fig. 5 I have shown the construction of the bar 49 which it will be observed consists of two parts, one of which is clamped in the opening 48 and is provided at its outer end with a threaded projection 51 to which a threaded sleeve 52 is secured. A short pin 53 extends between the end of threaded member 51 and the tool 50 and serves to hold the tool in adjusted position.

From the above description it will be apparent that I have produced a compound tool post that is adapted to have secured to it a number of different tools which can be adjusted so as to perform a certain portion of an operation and since this tool post can be quickly rotated about the center of the pin 20, either one of these tools can be brought into operative position very quickly and can be securely clamped in position by means of the pin 26 and the cam action of cams 32 on handle 31.

As an ordinary lathe is provided with a part corresponding to part 16 which has a T slot 18 in which the ordinary tool post is secured, it is evident that my compound tool post can be readily put into place by merely removing the ordinary tool post and replacing it with my improved structure. In this way it is possible to change any ordinary lathe so as to obtain a machine with which a greater amount of work can be accomplished, as by means of this simple tool post a number of tools can be properly adjusted and can be brought into position very quickly so that no time will be wasted in changing tools as this operation, as now performed, is quite tedious, whereas with my improved compound tool post, the time now wasted in shifting tools can be almost entirely saved.

Having described the invention what is claimed as new is:

1. A compound tool post comprising a base having an upwardly extending journal, a turret block mounted for rotation about the axis of the journal, said journal having an axial opening, the lower surface of the turret block having a plurality of slots extending radially from the axis of rotation, the base having an opening, a pin in the opening in the base, means comprising a spring for normally holding the pin with its end projecting above the upper surface of the base, means comprising a rod extending through the opening in the journal for moving the pin downwardly against the action of the spring, and means comprising a cam pivoted to the upper end of the journal for forcing the turret block against the base.

2. A compound tool post comprising a base having an upwardly extending tubular journal, said base having an opening spaced from the journal, a pin in said opening, a rod slidable in the opening in the journal, means for interconnecting the rod and pin so that they move in unison, a spring secured to the base and engaging the interconnecting means, said spring being tensioned to move the rod and pin upwardly, and means comprising a cam pivotally secured to the journal for moving the rod and pin downwardly against the tension of the spring.

3. A compound tool post comprising a base having an upwardly extending tubular journal, said base having an opening spaced from the journal, a pin in said opening, a rod slidable in the opening in the journal, means for interconnecting said rod and pin so that they move in unison, a spring secured to the base and engaging the interconnecting means, said spring being tensioned to move the pin upwardly, means comprising a cam secured to the journal for moving the rod and pin downwardly against the tension of the spring, a turret block rotatably secured to the journal, the under surface of said block resting on the upper surface of the base, the turret block having its under surface provided with radial grooves with which the pin can engage, and means comprisng a cam for forcing the turret block towards the base.

4. A tool post for lathes, comprising a base member provided with an upwardly extending tubular journal, the upper end of said journal having a diametrical notch, a cam located in the notch and pivotally attached to the journal, a rod slidable in the journal, said base having an opening located to one side of the journal, a locking pin in the opening in the base, means for interconnecting the rod and pin so that they will move in unison, means comprising a spring for normally moving the rod and pin upwardly, a turret block rotatably secured to the journal, the lower surface of said block having radial slots adapted to receive the locking pin, and means comprising a cam for moving the pin to unlocking position when in one position and another cam for forcing the turret block against the upper surface of the base when the first cam is in inoperative position.

In testimony whereof I affix my signature.

WILLIAM A. HYATT.